United States Patent Office 3,238,045
Patented Mar. 1, 1966

3,238,045
PROCESS FOR MODIFYING NON-FAT
DRY MILK SOLIDS
George A. Damisch, Jr., Syracuse, and Richard A. Johnson, Dewitt, N.Y., assignors to The Borden Company, New York, N.Y., a corporation of New Jersey
No Drawing. Filed Dec. 19, 1963, Ser. No. 331,944
3 Claims. (Cl. 99—56)

This invention relates to a process for the preparation of non-fat dry milk solids having improved dispersibility, bulk, solubility and flavor characteristics.

It has been proposed, according to prior art methods, to improve the dispersibility and solubility of dry milk powder products by incorporating therein small amounts of lecithin. Though these methods have generally achieved the desired results, the amount of lecithin that has to be used causes various drawbacks, among which are an off-flavor and a greasiness on the surface of the powder which causes lumping and results in an undesirable feel on the tongue of the consumer when the powder is mixed in water to form a reconstituted milk.

Another method employed is increase in the bulk density of milk powder products, as by agglomeration. Here again the results are not entirely satisfactory. Agglomeration results in a significant percentage of the powder being rejected as fines. Moreover, the process of agglomeration proceeds at a slow production rate in order to minimize the loss of fines.

It has now been found possible to prepare a non-fat dry milk powder which is excellently suitable for mixing with water to form a reconstituted skim milk and where the powder possesses the properties of good dispersibility, flowability, wettability and displays minimal tendency to foam upon mixing with water, while at the same time having good stability, flavor and absence of greasiness. Moreover, the rate of production is markedly increased and the percentage of fines significantly reduced.

According to the present invention liquid anhydrous lecithin, preferably diluted with a vegetable oil, is mixed with warm non-fat dry milk solids in an amount from 0.033 to 0.066% active lecithin, based on the weight of the total solids, until the lecithin is thoroughly and evenly distributed throughout the powder. Thereafter the so-treated product is increased in bulk density, preferably by being moistened and agglomerated to produce a final agglomerated product.

Lecithin, the commercial name for a mixture of phospholipids, is commercially available as derived from various vegetable oils such as cotton seed oil, corn oil or soybean oil. Commercially available lecithin products suitable for use in the present invention generally comprise lecithin dispersed in an oil carrier wherein the lecithin comprises at least 60% of the commercial product. Lecithin dispersed in a soybean oil carrier is particularly suitable for practice in this invention. The portion of commercial lecithin preparation comprising acetoneinsolubles is generally termed "active lecithin," and in the process of this invention, as indicated above, active lecithin must be present in the final powder in an amount of about 0.033 to 0.066% by weight of the dry powder. Contrary to the general teaching of the prior art, it has been found that the use of such a low level of lecithin will still result in the above enumerated improved properties, while at the same time avoiding the undesirable off-flavor, greasiness and instability encountered when using larger quantities of lecithin with non-fat dry milk solids.

Though the lecithin may be added to the non-fat dry milk solids in the form of the oil-derived lecithin product commercially available as described above, it is often found to be advantageous to dilute the lecithin product with a vegetable oil in a ratio of from about 1:1 to 1:3. Suitable vegetable oils which may be used for dilution of the lecithin product include coconut oil, corn oil and palm oil.

The lecithin in the form of a soya lecithin product or diluted with vegetable oil, may be applied to the powder by the so-called "drip" method. Namely, calibrated flow through an orifice or orifices of predetermined diameter at a rate to cause "dripping" rather than full stream, onto powder passing on an endless belt or in an enclosed auger at a given rate, or atomized onto the surface of the dry milk solids by pneumatic or hydraulic spray systems, all of the equipment being conventional. The temperature of the lecithin or lecithin mixture is maintained, for optimum flowability through the orifice or orifices, in fluid condition, as at a temperature of 110°–180° F. the exact temperature varying with the grade of lecithin used. The powder should then be thoroughly mixed generally for a period of 3 to 15 minutes in a mixing chamber such as a suitable length auger or a continuous or batch dry blender.

In order to achieve a thorough surface coverage of the non-fat dry milk solids, the lecithin either in the form of a concentrated soya lecithin product or as diluted with vegetable oils in the manner described, should be heated to a temperature of about 120° F. to 160° F. while the temperature of the milk solids is maintained during mixing at a temperature varying from about 100° F. to 140° F.

After thorough mixing the lecithin-containing powdered non-fat dry milk solids should then be allowed to cool to approximately room temperature and thereafter may be subjected to agglomeration. Agglomeration of the powder particles is accomplished by methods generally known in the prior art. Thus, in general the powder particles are passed through a zone where water or steam is applied thereto in a sufficient amount to render the surface of the particles adhesive and thereby cause these particles to adhere together in the form of aggregates or granules of random shape. These aggregates thereafter pass continuously through a second zone wherein excess moisture is removed to result in the agglomerated product having the desired moisture content, i.e., of the order of 3.0 to 4.0%.

In order to more fully illustrate the present invention the following example is presented wherein all parts are by weight unless otherwise indicated.

*Example I*

One hundred pounds of freshly spray-dried non-fat dry milk solids at a temperature between 105° F.–120° F. was placed in a ribbon blender. A lecithin-coconut oil mixture (45.4 grams) previously admixed in the ratio of 1:1 and at a temperature of 140° F. was applied to the surface of the mentioned particles while the particles were being mixed through action of operating arms of the blender. The lecithin mixture reservoir, in this instance, was a standard 125 ml. separatory funnel with a steam diameter of 5 mm. and the flow rate was controlled by action of the stopcock at 1 drop every 5 seconds. The temperature of the lecithin mixture was maintained at 140° F. in the separatory funnel, to give flowability. The treated powder was mixed within the blender for 15 minutes after application of the lecithin mixture. The product was then removed and stored in sealed fibre drums prior to use.

The product showed excellent dispersibility and solubility in water. After being aged at room temperature for 72 hours the product was agglomerated in a Blaw-Knox Instantizer. This is a device wherein the product is fed into a chamber containing air of high humidity (the water being supplied by steam). The particles of the product are moistened, adhere together while continuing their passage through the chamber, and are cooled.

The result was a product containing masses of agglomerated particles. The agglomeration increased the bulk density of the product and its dispersibility in water.

*Example II*

One hundred pounds of freshly spray dried non-fat dry milk solids was treated as in Example I except that the lecithin coconut oil mixture was atomized through a model 18SS pressure-siphon Binks spray gun using nitrogen gas as an atomizing agent. Equally good results were obtained.

*Example III*

One hundred thousand pounds of freshly spray dried non-fat dry milk solids was treated with a lecithin-coconut oil mixture at 140° F. immediately after removal from the dry box at a temperature of 125° F.–135° F. in an enclosed auger-conveyor, at a rate of 3,800 lbs. per hour. A stainless steel twenty foot auger, twelve inches in diameter and containing a ten inch screw operating at 10.5 r.p.m. was used as the mixing chamber. A Zenith metering pump was used to supply the lecithin-coconut oil mixture to a ¼" JSS hydraulic-pneumatic spraying system nozzle, located in a vented housing on the auger cover plate, where it was atomized six inches above the moving powder using nitrogen gas. The Zenith pump was pre-calibrated by use of the vari-drive to deliver 28±2 grams of the lecithin-coconut oil mixture per minute.

The lecithin treated product discharged from the auger into a vibrating surface cooler where the product admixed additionally as it traveled the 40-foot bed.

The product showed increased dispersibility and solubility over the non-fat dry milk made in the same manner but without lecithin treatment.

It will be understood that it is intended to cover all changes and modifications of the example of the invention herein chosen for the purpose of illustration which do not constitute departures from the spirit and scope of the invention.

What is claimed is:

1. A method of preparing a dried non-fat milk solids product, having improved dispersibility, bulk and flavor properties comprising the steps of coating non-fat dry milk solids at a temperature between about 100° F. to 140° F. with a member of a group at a temperature between about 110° F. to 180° F. which member is selected from the group consisting of lecithin and lecithin solutions, wherein the quantity of active lecithin is between 0.033% and 0.066% by weight of said solids, mixing until the lecithin is coated on said solids, and thereafter increasing the bulk density of the product.

2. A method according to claim 1 wherein the bulk density is increased by agglomerating the lecithin-containing powder.

3. A method according to claim 2 wherein the lecithin is distributed on said non-fat dry milk particles while diluted with a vegetable oil in a ratio of from about 1:1 to 1:3.

References Cited by the Examiner

UNITED STATES PATENTS

| | | | |
|---|---|---|---|
| 2,953,458 | 9/1960 | Sjollema | 99—56 |
| 2,970,913 | 2/1961 | Loewenstein | 99—56 X |
| 3,042,526 | 7/1962 | Spiess et al. | 99—201 |
| 3,126,283 | 3/1964 | Noznick et al. | 99—55 |

A. LOUIS MONACELL, *Primary Examiner.*